(12) United States Patent
Panigrahi et al.

(10) Patent No.: US 11,609,583 B2
(45) Date of Patent: Mar. 21, 2023

(54) SYSTEMS AND METHODS FOR NIGHTTIME DELIVERY MOBILE ROBOT WITH HYBRID INFRARED AND FLASH LIGHTING

(71) Applicant: Ford Global Technologies, LLC, Dearborn, MI (US)

(72) Inventors: Smruti Panigrahi, Farmington Hills, MI (US); Justin Miller, Jr., Berkley, MI (US); Timothy Mark Feldkamp, Ann Arbor, MI (US); Jianbo Lu, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 323 days.

(21) Appl. No.: 17/066,943

(22) Filed: Oct. 9, 2020

(65) Prior Publication Data
US 2022/0113745 A1      Apr. 14, 2022

(51) Int. Cl.
*G05D 1/12*     (2006.01)
*G06T 7/11*     (2017.01)
(Continued)

(52) U.S. Cl.
CPC ............... *G05D 1/12* (2013.01); *B60Q 1/02* (2013.01); *G01C 21/206* (2013.01);
(Continued)

(58) Field of Classification Search
CPC ...... G05D 1/12; G05D 1/0016; G05D 1/0212; G05D 1/0242; G05D 1/0246; B60Q 1/02;
(Continued)

(56) References Cited

U.S. PATENT DOCUMENTS 9,535,421 B1    1/2017  Canoso et al.
10,249,200 B1 *  4/2019  Grenier ................ G08G 5/025
(Continued)

FOREIGN PATENT DOCUMENTS

CN          108230346 A  *  6/2018
WO       2018206514 A1    11/2018
WO    WO-2020057753 A1  *  3/2020

OTHER PUBLICATIONS

Machine Translation: CN-108230346-A (Year: 2018).*
Sun et al., RTFNet: RGB—Thermal Fusion Network for Semantic Segmentation of Urban Scenes, Jul. 2019 (Year: 2019).*

*Primary Examiner* — Anne Marie Antonucci
*Assistant Examiner* — Connor L Knight
(74) *Attorney, Agent, or Firm* — Brandon Hicks; Eversheds Sutherland (US) LLP

(57) ABSTRACT

A nighttime delivery system is configured to provide delivery of packages during night hours, in low or no-light conditions using a multi-mode autonomous and remotely controllable delivery robot. The system involves the use of a baseline lighting system onboard the robot chassis, with variable light intensity from single flash and floodlighting, to thermal imaging using infrared cameras. The lighting system changes according to various environmental factors, and may utilize multi-mode lighting techniques to capture single-shot images with a flash light source to aid in the robot's perception when the vehicle is unable to navigate using infrared (IR) images.

11 Claims, 8 Drawing Sheets

(51) Int. Cl.

| | | |
|---|---|---|
| *G06T 7/136* | (2017.01) | |
| *G05D 1/00* | (2006.01) | |
| *G05D 1/02* | (2020.01) | |
| *B60Q 1/02* | (2006.01) | |
| *G01C 21/20* | (2006.01) | |
| *G06K 9/00* | (2022.01) | |
| *G06V 20/10* | (2022.01) | |
| *G06V 20/56* | (2022.01) | |

(52) U.S. Cl.
CPC ......... *G05D 1/0016* (2013.01); *G05D 1/0212* (2013.01); *G05D 1/0242* (2013.01); *G06T 7/11* (2017.01); *G06T 7/136* (2017.01); *G06V 20/10* (2022.01); *G06V 20/56* (2022.01); *G06T 2207/10016* (2013.01); *G06T 2207/30252* (2013.01)

(58) Field of Classification Search
CPC . G06T 7/11; G06T 7/136; G06T 2207/10016; G06T 2207/30252; G06V 20/10; G06V 20/56
See application file for complete search history.

(56) References Cited

U.S. PATENT DOCUMENTS

| | | |
|---|---|---|
| 10,332,065 B2 | 6/2019 | Ferguson et al. |
| 10,386,850 B2 | 8/2019 | Heinla et al. |
| 2017/0316333 A1* | 11/2017 | Levinson ......... B60W 60/00274 |
| 2018/0329617 A1* | 11/2018 | Jones .................. G06F 3/04847 |
| 2019/0287051 A1* | 9/2019 | Heinla .................. G06Q 50/28 |
| 2020/0143551 A1* | 5/2020 | Gonzalez Aguirre .. G06T 7/187 |
| 2021/0110137 A1* | 4/2021 | Kerzner ............... G06K 9/6215 |
| 2021/0164785 A1* | 6/2021 | Dooley .................. G01S 17/89 |
| 2021/0405638 A1* | 12/2021 | Boyraz ................ G05D 1/0094 |
| 2022/0308228 A1* | 9/2022 | Raag ....................... G01S 17/86 |

* cited by examiner

SYSTEMS AND METHODS FOR NIGHTTIME DELIVERY MOBILE ROBOT WITH HYBRID INFRARED AND FLASH LIGHTING

BACKGROUND

The rise of autonomy and robots in the package delivery business is a growing business trend. The advantage of robotic package delivery is that one can minimize downtime and optimize operational efficiency. Robots can perform delivery at odd hours, such as at night, while humans sleep. Nighttime operation will also be more efficient due to less vehicular traffic, which will greatly improve the speed of the delivery. Robots operating at nighttime will encounter less uncertain environments with few moving obstacles on the sidewalk. Hence, package delivery at nighttime will be the future of the goods delivery business. Robots can be used to deliver goods without human involvement, but are limited in their ability at nighttime due to poor visibility and sensor limitations.

Technologies disrupting the transportation ecosystem currently include self-driving cars and trucks and the shared economy. While these technologies may cover long travel miles, they are not directly affecting the last-mile delivery, which is likely the bottleneck for a product's journey between manufacturer and the end customer. With the proliferation of e-commerce, many brands increasingly look for opportunities to sell directly to customers. This fact will escalate last-mile logistics challenges. Customers desire a seamless shopping experience with fast, convenient delivery. From the e-commerce supply side, increased service requirements and greater supply chain complexity will lead to higher costs for logistics.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
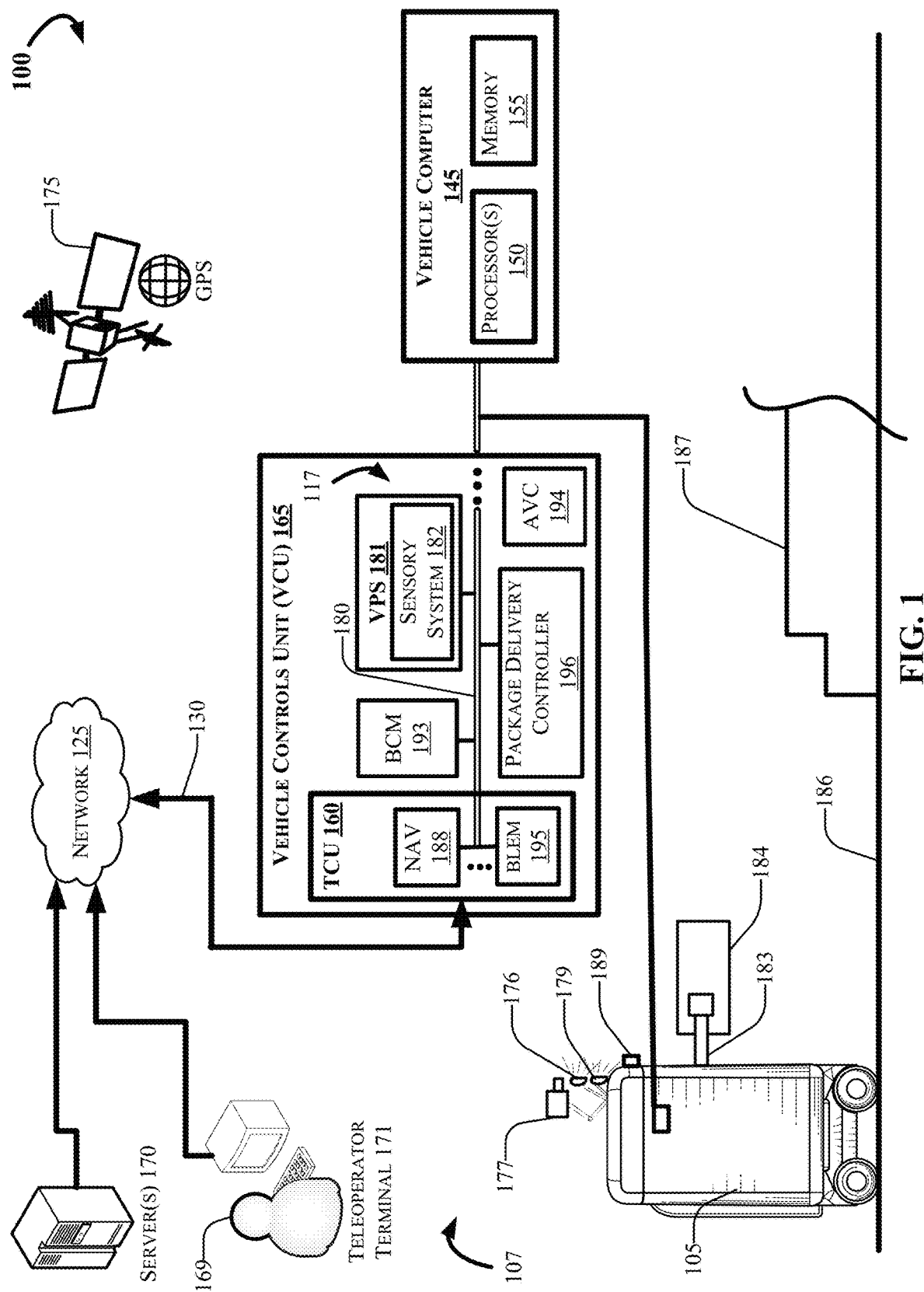
FIG. 1 depicts an example computing environment in which techniques and structures for providing the systems and methods disclosed herein may be implemented.

The systems and methods disclosed herein are configured and/or programmed to achieve delivery (e.g., at least the last 100 feet) during nighttime conditions using multi-mode autonomous and remotely controllable delivery robots. The system involves the use of a baseline lighting system onboard the robot chassis, with variable light intensity that changes according to various environmental factors. For example, in the presence of pedestrians, the light glows brighter to let the pedestrians know of the robot's knowledge of their presence. The nighttime delivery system may also utilize multi-mode lighting techniques to capture single-shot images with a flash light source to aid in the robot's perception when the delivery vehicle is unable to navigate using infrared (IR) images.

The nighttime delivery system may use three methods to perform nighttime perception, either independently or in combination with remote operation. In a first method, the nighttime delivery system may utilize semantic segmentation based on IR thermal signature image signatures. Using this method, the vehicle may map the thermal signature from the IR image to different areas in the operating environment and use a labeling algorithm to classify pixels in the IR image as object types. The delivery system may combine the IR semantic segmentation information with map data to label traversable areas.

In a second method, the nighttime delivery system may utilize semantic segmentation on a flash-image and map the segmentation to the IR image segmentation. The nighttime delivery system may utilize two input sources that can include an IR camera feed and one single-shot color flash image at the start of the delivery operation. The nighttime delivery system performs semantic segmentation on the single-shot color flash image and maps the semantics obtained from the single-shot color flash image to the semantics obtained from the IR image. The robotic vehicle compares the comparison mapping information with a real-time image stream to compute a confidence level indicating whether the nighttime delivery robot has sufficient information to complete the delivery independently or whether the vehicle should send a teleoperation message to a teleoperator terminal manned by a human-robot controller for remote control of the delivery task.

In a third method, the nighttime delivery system detects a doorway at a destination using the above methods. Once the robot arrives at the destination, the vehicle adjusts a camera system to various orientations and obtains multiple flash images from which a door location may be determined.

When the robot is unable to make decisions due to an insufficient confidence value (that is, a quantitative value associated with the reliability of perceived conditions does not meet or exceed a threshold for reliability), the vehicle automatically switches to a teleoperation mode by notifying a teleoperator and opening a control channel, through which the teleoperator can control the robot. The teleoperator can utilize remote environmental navigation controls including Virtual Reality (VR) goggles and a controller to operate the vehicle from a remote location by steering the vehicle, actuating vehicle mechanisms, and controlling motive control of the nighttime delivery robot. While being controlled remotely, the robot may continue to perform semantic segmentation on the IR and color image feeds and notify the teleoperator when the vehicle is able to make high confidence determinations of the operating environment. The vehicle may then regain autonomous control to complete the delivery task or allow the teleoperator to complete the task if autonomous operation is not within a confidence threshold that predicts successful delivery.

Embodiments described herein may provide robust and flexible last-mile package delivery that does not require daylight to perform the delivery tasks. The system and methods described may provide efficiencies by performing delivery of packages at night, while maximizing battery power onboard the robot through novel techniques that utilize minimal light that can drain batteries and disrupt customers. In other aspects, the nighttime delivery system may collect data during the teleoperation phase and utilize machine learning techniques, which can include deep learning, to train and improve the robot's perception, decision making, and control performance.

These and other advantages of the present disclosure are provided in greater detail herein.

Illustrative Embodiments

The disclosure will be described more fully hereinafter with reference to the accompanying drawings, in which example embodiments of the disclosure are shown, and not intended to be limiting.

Self-driving delivery platforms may curb the high cost of last-mile and last 100-meter delivery of goods. To improve delivery efficiency, nighttime package delivery using robots will be crucial due to low traffic during nighttime hours. Disclosed embodiments describe robot navigation and package delivery at nighttime or during low-light conditions. A nighttime delivery robot can include a combination of infrared (IR) cameras, a triggered-flash light source, LiDAR, and ultrasonic sensors configured and/or programmed to facilitate autonomous operation. The nighttime delivery robot may utilize semantic segmentation on IR image streams to map semantics from a Red-Green-Blue (RGB) color image to a heat signature image obtained from IR sensor(s) onboard the vehicle. The nighttime delivery system may also seamlessly transition between autonomous navigation and teleoperation in low ambient lighting. The robotic vehicle is configurable to include any robotic chassis, such as bipedal robot, a 4-legged robot, a wheeled robot, etc. The nighttime delivery robot may further include robotic arms for loading, unloading, and performing other delivery tasks.

FIG. 1 depicts an example computing environment 100 that can include a robotic vehicle 105. The vehicle 105 can include a robotic vehicle computer 145, and a Vehicle Controls Unit (VCU) 165 that typically includes a plurality of electronic control units (ECUs) 117 disposed in communication with the robotic vehicle computer 145, which may communicate via one or more wireless connection(s) 130, and/or may connect with the vehicle 105 directly using near field communication (NFC) protocols, Bluetooth® protocols, Wi-Fi, Ultra-Wide Band (UWB), and other possible data connection and sharing techniques.

The vehicle 105 may also receive and/or be in communication with a Global Positioning System (GPS) 175. The GPS 175 may be a satellite system (as depicted in FIG. 1) such as the global navigation satellite system (GLNSS), Galileo, or navigation or other similar system. In other aspects, the GPS 175 may be a terrestrial-based navigation network, or any other type of positioning technology known in the art of wireless navigation assistance.

The robotic vehicle computer 145 may be or include an electronic vehicle controller, having one or more processor(s) 150 and memory 155. The robotic vehicle computer 145 may, in some example embodiments, be disposed in communication with a mobile device 120 (not shown in FIG. 1), and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a robotic vehicle fleet.

Although illustrated as a four-wheeled delivery robot, the vehicle 105 may take the form of another robot chassis such as, for example, a two-wheeled vehicle, a multi-wheeled vehicle, a track-driven vehicle, etc., and may be configured and/or programmed to include various types of robotic drive systems and powertrains.

According to embodiments of the present disclosure, the nighttime delivery system 107 may be configured and/or programmed to operate with a vehicle having a Level-1 through Level-4 autonomous vehicle controller (AVC) 194. An example AVC 194 is described in greater detail with respect to FIG. 8. Accordingly, the nighttime delivery system 107 may provide some aspects of human control to the vehicle 105, when the vehicle is configured as an AV.

In some aspects, the mobile device 120 may communicate with the vehicle 105 through the one or more wireless connection(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless connection(s) 130 are depicted in FIG. 1 as communicating via the one or more network(s) 125, and via one or more wireless connection(s) 130 that can be direct connection(s) between the vehicle 105 and the mobile device 120. The wireless connection(s) 130 may include various low-energy protocols including, for example, Bluetooth®, BLE, or other Near Field Communication (NFC) protocols.

The network(s) 125 illustrate an example of communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The robotic vehicle computer 145 may be installed in an interior compartment of the vehicle 105 (or elsewhere in the vehicle 105) and operate as a functional part of the nighttime delivery system 107, in accordance with the disclosure. The robotic vehicle computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a nighttime package delivery program code. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

The VCU 165 may share a power bus (not shown in FIG. 1) with the robotic vehicle computer 145, and may be configured and/or programmed to coordinate the data between vehicle 105 systems, connected servers (e.g., the server(s) 170, and other vehicles such as a transport and mobile warehouse vehicle (not shown in FIG. 1) operating as part of a vehicle fleet. The VCU 165 can include or communicate with any combination of the ECUs 117, such as, for example, a Body Control Module (BCM) 193, and a package delivery controller 196 configured and/or programmed to control a package delivery mechanism 183. The VCU 165 may further include and/or communicate with a Vehicle Perception System (VPS) 181, having connectivity with and/or control of one or more vehicle sensory system(s) 182. In some aspects, the VCU 165 may control operational aspects of the vehicle 105, and implement one or more instruction sets operational as part of the nighttime delivery system 107. The VPS 181 may be disposed in communication with a package delivery controller 196.

The VPS 181 may include a LIDAR device, a sonar device, an IR camera, an RGB camera, an inertial measurement unit (IMU), and/or other sensing devices disposed onboard the vehicle, which may be used by the package delivery controller 196 to sense vehicle location, generate a navigation map (not shown in FIG. 1), and navigate to the destination 187. The vehicle 105 may generate the navigation map with or without using a prior high definition map, and may update the map, once created or accessed, with new information encountered during delivery operations.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a Bluetooth® Low-Energy (BLE) Module (BLEM) 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault-tolerant CAN (up to 125 Kbps), which may, in some configurations, use a linear bus configuration. In some aspects, the ECUs 117 may communicate with a host computer (e.g., the robotic vehicle computer 145, the nighttime delivery system 107, and/or the server(s) 170, etc.), and may also communicate with one another without the necessity of a host computer such as, for example, a teleoperator terminal 171. The bus 180 may connect the ECUs 117 with the robotic vehicle computer 145 such that the robotic vehicle computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for example purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human teleoperators, inputs from the AVC 194, the nighttime delivery system 107, and/or via wireless signal inputs received via the wireless connection(s) 130 from other connected devices. The ECUs 117, when configured as nodes in the bus 180, may each include a central processing unit (CPU), a CAN controller, and/or a transceiver (not shown in FIG. 1).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1). The BCM 193 may further include robot power management circuitry that can control power distribution from a power supply (not shown in FIG. 1) to vehicle 105 components.

The BCM 193 may coordinate any one or more functions from a wide range of vehicle functionality, including energy management systems, alarms, vehicle immobilizers, driver and rider access authorization systems, and other functionality. In other aspects, the BCM 193 may control auxiliary equipment functionality, and/or be responsible for integration of such functionality.

The computing system architecture of the robotic vehicle computer 145, VCU 165, and/or the nighttime delivery system 107 may omit certain computing modules. It should be readily understood that the computing environment depicted in FIG. 1 is an example of a possible implementation according to the present disclosure, and thus, it should not be considered limiting or exclusive.

The sensory systems 182 may provide the sensory data obtained from the sensory system 182 responsive to an internal sensor request message. The sensory data may include information from various sensors where the sensor request message can include the sensor modality with which the respective sensor system(s) are to obtain the sensory data.

The sensory system 182 may include one or more camera sensor(s) 177, which may include thermal cameras, optical cameras, and/or a hybrid camera having optical, thermal, or other sensing capabilities. Thermal and/or infrared (IR) cameras may provide thermal information of objects within a frame of view of the camera(s), including, for example, a heat map figure of a subject in the camera frame. An optical camera may provide RGB and/or black-and-white image data of the target(s) and/or the robot operating environment within the camera frame. The camera sensor(s) 177 may further include static imaging, or provide a series of sampled data (e.g., a camera feed).

The sensory system 182 may further include an inertial measurement unit IMU (not shown in FIG. 1), which may include a gyroscope, an accelerometer, a magnetometer, or other inertial measurement device.

The sensory system 182 may further include one or more lighting systems such as, for example, a flash light source 179, a high beam light source 176, and the camera system 177. The flash light source 179 may include a flash device, similar to those used in photography for producing a flash of artificial light (typically $\frac{1}{1000}$ to $\frac{1}{200}$ of a second) at a color temperature of about 5500 K to illuminate a scene, and/or capture quickly moving objects or change the quality of light in the operating environment 100. Flash refers either to the flash of light itself or to the electronic flash unit (e.g., the flash light source 179) discharging the light. Flash units are commonly built directly into a camera. Some cameras allow separate flash units to be mounted via a standardized "accessory mount" bracket (a hot shoe).

The sensory system 182 may further include a high beam light source 176, having a broad-beamed, high-intensity (e.g., 75-100 lumens/Watt) artificial light. Where the flash light source 179 may be configured for a single, short-duration flash of light, the high beam light source 176 may be configured to produce a continuous supply of high-intensity light that lights the operating environment 100.

The package delivery controller 196 may include program code and hardware configured and/or programmed for obtaining images and video feed via the VPS 181, and performing semantic segmentation using IR thermal signatures, RGB images, and combinations of RGB and IR thermal imaging obtained from the sensory system 182. Although depicted as a separate component with respect to the robot vehicle computer 145, it should be appreciated that any one or more of the ECUs 117 may be integrated with and/or include the robot vehicle computer 145.

Figure 2:
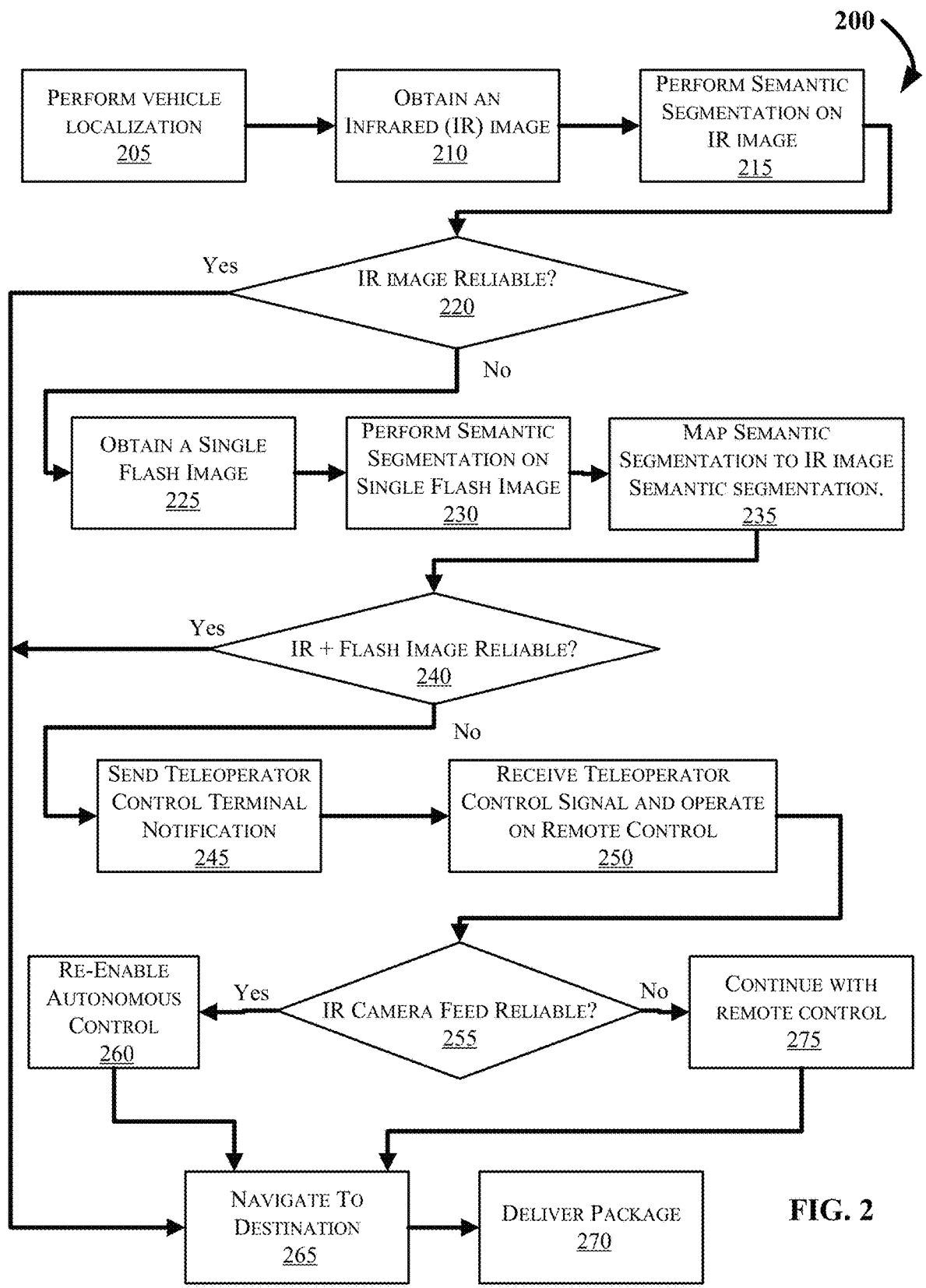
FIG. 2 depicts a flow diagram of an example method for nighttime delivery using an autonomous and remotely-controlled delivery robot in accordance with the present disclosure.

As an overview of embodiments described in greater detail in the following sections, FIG. 2 depicts a flow diagram of an example method for nighttime delivery 200 using the vehicle 105 via autonomous and/or remote control, in accordance with the present disclosure. FIG. 2 is considered with continued reference to elements depicted in FIG. 1.

The nighttime delivery system 107 may be configured and/or programmed as a framework for nighttime robot operations for package delivery. The sensors and computation onboard vehicle 105 processes environmental data and navigates on sidewalks and other paths at nighttime. The nighttime delivery system 107 may operate independently using the AVC 194 (described in greater detail with respect to FIG. 8 hereafter) and may receive control signals from the teleoperator terminal 171 via the TCU 160 when connected remotely with the terminal via the network(s) 125. A human operator through a teleoperator terminal 171. The nighttime delivery system 107 may transition from autonomous mode to teleoperation mode when the robot is unable to perform safe decision making to ensure successful navigation.

The vehicle 105 can work at nighttime to deliver packages 184 from a central hub such as a mobile warehouse or delivery vehicle (not shown in FIG. 1) to a delivery destination 187 by autonomous operation, and via a teleoperator control from a human operator 169 sending control signals via the teleoperator terminal 171 to provide navigation instructions for the vehicle 105 along a vehicle path 186. Although depicted in FIG. 1 as having a four-wheeled chassis, it should be appreciated that the delivery system 107 may be configured and/or programmed to operate within a geo-fenced area (e.g., a city block, a neighborhood, a city or town, etc., not shown in FIG. 1) and can be adapted to various robot types used and not depicted herein (including, for example, omni-directional wheeled robots, legged robots, etc.), and may be adapted based on the payload being delivered. The radius of the geo-fence can be manipulated by a central command center (e.g., a command center associated with the teleoperator terminal 171) to meet specific requirements and situations encountered during nighttime package deliveries.

In the case of package delivery, the vehicle 105 may perform mapping, semantic labeling, path planning using localization sensors and processing hardware and software disposed onboard the vehicle 105, as the vehicle navigates from the mobile warehouse to the destination 187, which may be, for example, a doorstep, hallway, or other location.

Starting at step 205, the nighttime delivery system 107 (hereafter "system 107") may perform vehicle 105 localization and routing of the vehicle 105 on the vehicle path 186 using Real-Time Kinematic (RTK) (GPS).

At step 210, the system 107 may scan the operating environment 100 and take one or more IR images using the IR camera operative as part of the VPS 181, to identify markers such as obstacles, navigable paths (sidewalks), unnavigable areas, and a destination 187, which may be a doorway, doorstep, or other location.

At step 215, the system 107 may perform semantic segmentation on the IR image obtained using the VPS 181, which may include a single heat map image, or a series of IR images. The robotic vehicle computer 145 may map the IR thermal signature of objects and surfaces identified in the IR image to different areas associated with the map (e.g., a sidewalk, a road, pathway, etc.), utilizing a labeling algorithm to classify each pixel in the IR camera feed image(s) as a type of object. The robotic vehicle computer 145 may combine this information with the map data to label which areas that may be traversable by the nighttime delivery system 107 (e.g., roads and sidewalks), identify areas that are non-navigable, and identify the destination 187 on the map. The system 107 may perform this process using one or more identification algorithms that may be trained using a deep learning artificial intelligence neural network. For example, a convoluted neural net (CNN) model, or another known method may be used for area identification in the semantic segmentation processes described herein, and assign to each pixel a trained weight associated with each relative identification. The system 107 may utilize the trained weights to receive a real-time IR video feed from the VPS 181, and use the real-time IR video feed to detect a navigable path (e.g., the vehicle path 186).

At step 220, the system 107 may determine if the IR camera feed is reliable, and more particularly, determine if the semantic segmentation performed using the IR camera feed provides statistical reliability sufficient to perform path planning, and for generating a navigation trajectory for the robot to navigate on the vehicle path 186.

Responsive to determining that the IR camera feed is reliable (that is, at least a predetermined threshold for statistical reliability such as, for example, 80%, 90%, etc.), then the robot continues navigation using the RTK localization.

At step 270, the vehicle 105 may self-localize using position feedback as the vehicle 105 performs the navigation to the destination 187 according to the map and generated navigation trajectory. To identify the correct package recipient, the vehicle 105 may utilize camera sensors associated with the VPS 181 to locate a door or other target destination, and deposit the payload.

When the accuracy of mapping fails to meet the predefined thresholds, the vehicle 105 may obtain a second image using the flash light source 179, perform semantic segmentation on the color image, and map the flash color image semantics to the semantics performed on the IR image. The vehicle 105 may repeat this process whenever the confidence level on the IR semantics is below a predefined threshold.

For example, if at step 220 the system 107 determines that the IR camera feed is not sufficiently reliable, at step 225 the vehicle 105 may obtain a single flash image (image not shown in FIG. 1 or 2) using the camera system 177. More particularly, the camera system 177 may include an RGB camera system configured and/or programmed to obtain a single flash color image of the operating environment, with which the robotic vehicle computer 145 may perform a second semantic segmentation, as shown at step 230.

At step 235, the system 107 may map the second semantic segmentation on the RGB color flash image to the first semantic segmentation using the IR image.

At step 240, the system 107 determines whether the second (combined) IR and flash image mapped semantic segmentation is sufficiently reliable for plotting the vehicle path 186 by comparing the second segmentation results to the predetermined threshold for reliability. The semantics from the flash-image is used as a reliable segmentation map which is then compared to the semantics obtained by the IR image for a one-to-one correspondence of the semantics via pixel-by-pixel comparison of the semantic labeling from the flash-image. The flash-image to IR-image semantics mapping confidence level or the reliability is calculated by comparing the percentage of the pixel area on the IR-image semantics that match with the flash-image semantics. Responsive to determining that the second semantic segmentation was sufficiently reliable, the vehicle 105 may navigate to the destination at step 265.

When the system 107 at operation 240 is unable to make decisions due to lack of confidence level on the navigable path, the vehicle 105 may automatically switch to a teleoperation mode, and notify the teleoperator terminal 171 of the mode transition at step 245. The human operator 169 operating the teleoperator terminal 171 may be equipped with environmental viewing equipment such as, for example, virtual reality (VR) goggles, haptic controllers, etc., that enable the operator to take control of the nighttime delivery system 107 and perform aspects of the delivery operation remotely. The teleoperator may open and/or complete a communication channel with the nighttime delivery system 107, where the system 107 receives teleoperator control signal(s), and operates the vehicle 105 via robot control signals communicated using the network(s) 125 using remote control (as shown in step 250). For example, the teleoperator terminal may transmit a signal that enables the robot vehicle computer 145 to remotely turn on the high beam light source 176 disposed on the vehicle chassis, and receive a video feed of the operating environment (100, 400, 445, etc.) to perform the teleoperation control by navigating and reorienting the vehicle 105. The vehicle 105 may next obtain one or more images using the high beam light source 176, and use the images to perform semantic segmentation on the respective image(s), map the segmentation(s) to the first semantic segmentation from the IR image(s), and determine at step 255 if the camera feed images are sufficiently reliable.

The vehicle may continuously perform semantic segmentation and mapping while operated via remote control, and perform continuous testing at step 255 to determine when and if the vehicle 105 is ready to resume autonomous control of the delivery operation. At step 260, responsive to determining that the IR camera feed is reliable, the system 107 may re-enable autonomous control, and communicate a resume autonomous control signal that causes the teleoperator terminal 171 to relinquish robot control and resume navigation to the destination at step 265 when the system 107 is able to make decisions with a sufficiently high confidence level.

Responsive to determining that the robot remains unable to regain control, at step 275 the system 107 may continue with remote control and navigate to the destination at step 265 until package delivery at step 270.

In another embodiment, the teleoperation procedures described above can be further augmented with the inclusion of human input in the autonomy control loop by means of an explicit trajectory definition. For example, the teleoperator terminal 171 may further include a touch-panel associated with a mobile device or tablet. The human operator 169 may perform a combination of teleoperation that controls some aspects of the navigation, while the system 107 performs other aspects using autonomous navigation. For example, in one aspect, the teleoperator terminal 171 may present feedback data on the screen of the teleoperator terminal. The vehicle 105 may not, in the present example, steer itself, but may rather receive an input from the teleoperator terminal 171 indicative of the steering path, the destination 187 (e.g., the goal), or a whole trajectory for the navigation. Using this hybrid control method, the system 107 may perform the delivery semi-autonomously while receiving only portions of the navigation and/or motive control instructions via the teleoperator terminal. The human operator 169 may hand draw or sketch a path on the input device of the teleoperator terminal 171 (device not shown in FIG. 1 or 2) to provide the trajectory for the vehicle 105. The vehicle 105 may switch between the various modes during the navigation to the destination when the environment is dynamic, and/or when the robot is unable to determine next steps using the sensors and available information. As the human operator 169 continuously observes the environment through vehicle sensors (e.g., the VPS 181), the operator can also change the trajectory at any point in order to provide a new trajectory that avoids collisions with humans, animals, or objects in the operating environment.

Figure 3:
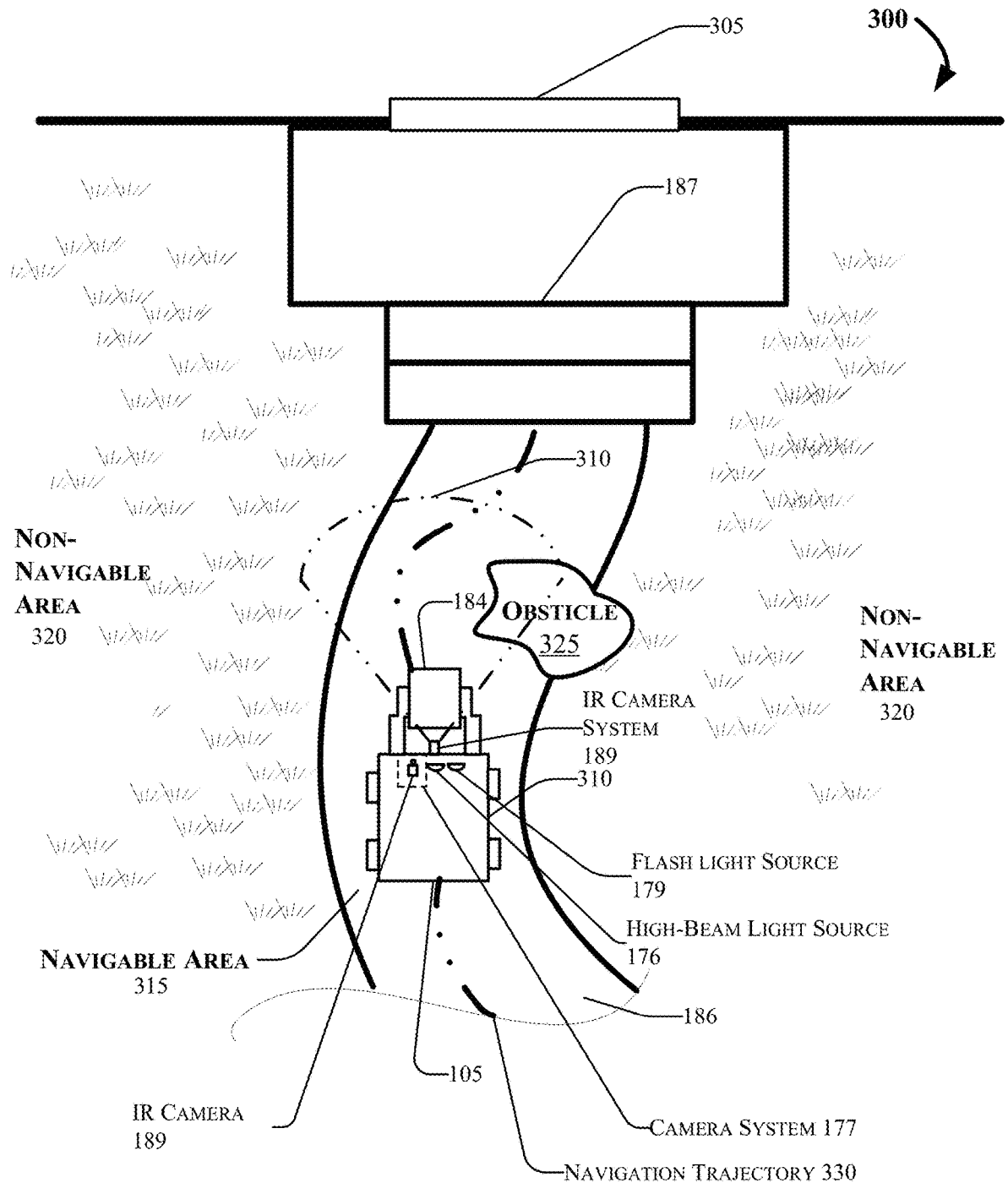
FIG. 3 is an operating environment in which a nighttime delivery system may operate in accordance with the present disclosure.

FIG. 3 depicts an operating environment 300 in which the nighttime delivery system 107 may operate, in accordance with the present disclosure. The vehicle 105 is shown in FIG. 3 operating on a navigable area 315 along the vehicle path 186. In one example scenario, an obstacle 325 intervenes the vehicle 105 and the destination 187. The vehicle 105 may obtain localization information indicative of a present location, and obtain an IR image stream, which may include a single image or a plurality of heat signature images, via an IR camera 189.

The vehicle 105 may obtain, from the IR image(s), heat signature data indicative of heat signature(s) of the operating environment 300 proximate to the vehicle 105. For example, an IR field 310 is depicted obtaining heat signature data associated with the navigable area 315, the non-navigable area 320, and an obstacle 325. In one aspect, the vehicle 105 may use the IR camera system 189 to perform semantic labeling using the IR thermal signature for respective objects and surfaces in the operating environment 300, detect moving objects, and generate a navigation trajectory 330 by performing a first semantic segmentation using the heat signature data. Accordingly, the robotic vehicle computer 145 (as shown in FIG. 1) may generate the navigation trajectory 330 and engage motive force that causes the vehicle 105 to avoid the obstacle 325 while staying within the navigable area 315 to deliver the package 184 at the destination 187. The navigation trajectory 330 may be overlaid on an environment map (not shown in FIG. 3) to determine the relative location(s) of the navigable area 315, obstacles 325, etc.

The map may specify the obstacle 325 in world coordinates, but may not specify where the navigable area 315 and/or the door 305 are located with respect to the vehicle 105. Semantic labeling can provide this information. The vehicle 105 may orient the camera system 177 (as shown in FIG. 1) disposed on the vehicle chassis can to various angles, and take single-shot images with the IR camera 189, and/or a color camera associated with the camera system 177 using a flash light source 179. The system 107 may perform semantic segmentation on the RGB image(s) and identify the sidewalk (e.g., the navigable area 315) and door 305. An example image labeling algorithm is the Pyramid Scene Parsing Network (PSPNet) which performs image-based scene parsing using a convolutional neural network. Other image labeling algorithms are possible, and such algorithms are contemplated.

Figure 4A:
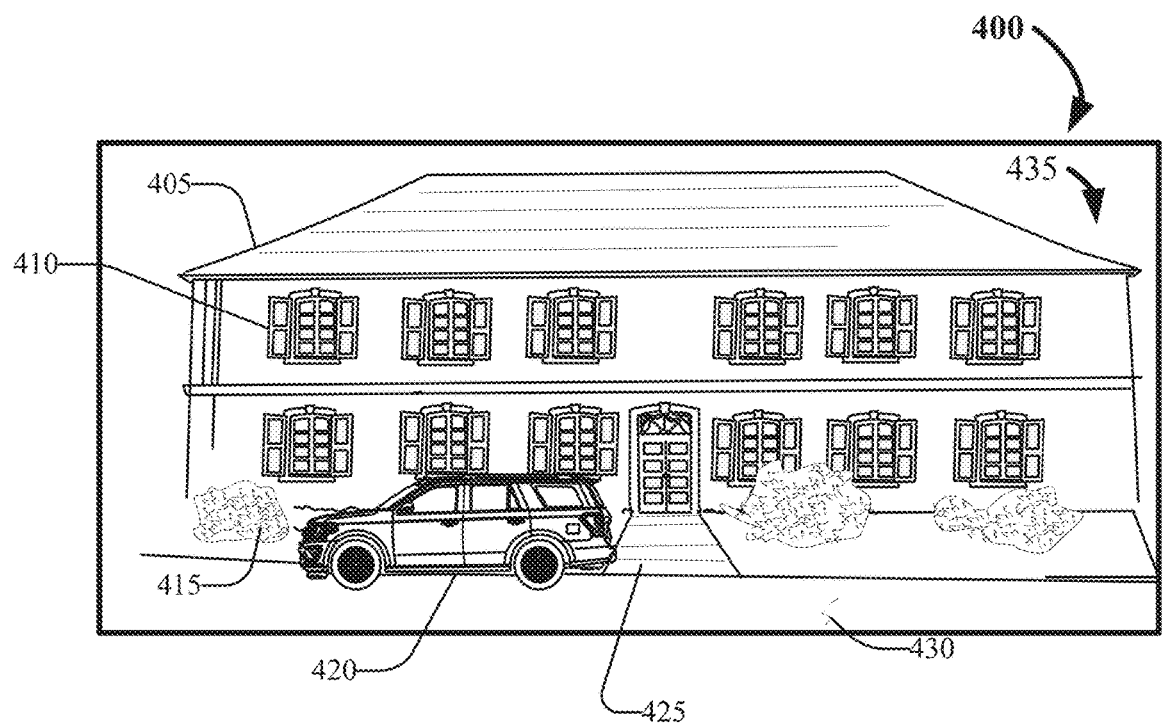
FIGS. 4A and 4B illustrate an example semantic segmentation and assessment of confidence level of the segmentation in accordance with the present disclosure.

FIG. 4A illustrates an example semantic segmentation and assessment of confidence level of the segmentation of an image frame 400, in accordance with the present disclosure. The image frame 400 may represent an RGB image frame or an IR image frame. According to one example embodiment, the system 107 may obtain the image frame 400 via the VPS 181, and perform semantic segmentation on the frame.

In computer vision, image segmentation is the process of partitioning a digital image into multiple segments (or sets of pixels, also known as image objects). More precisely, image segmentation is the process of assigning a label to every pixel in an image such that pixels with the same label share certain characteristics. The goal of segmentation generally is to simplify and/or change the representation of an image into something that is more meaningful and easier to analyze. Image segmentation is typically used to locate objects and boundaries (lines, curves, etc.) in images. The result of image segmentation is often a set of segments that collectively cover the entire image, or a set of contours extracted from the image using edge detection methods. Each of the pixels in a region are similar with respect to some characteristic or computed property, such as color, intensity, or texture. Adjacent regions are significantly different with respect to the same characteristic(s).

For example, as shown in FIG. 4A, the scene of a house 435 is depicted, including a roof 405, windows 410, vegetation 415, a vehicle 420 parked on the curb of a road 430, and a walkway 425 leading to a front door 440. According to described embodiments, the system 107 may utilize an image labeling algorithm, such as PSPNet using a convolutional neural network, to parse the image frame 400, segment each pixel (pixels not shown in FIG. 4A) in the image frame, and label each respective pixel such that the labeled pixels may be grouped into like groups defined in FIG. 4B.

Figure 4B:
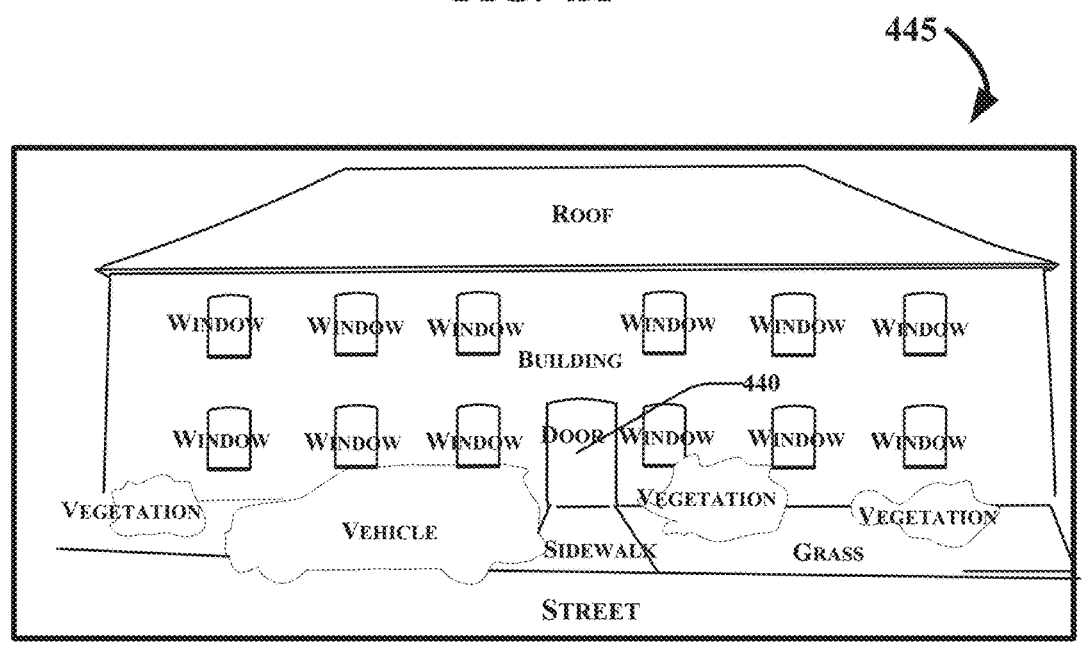
Figure 4B:
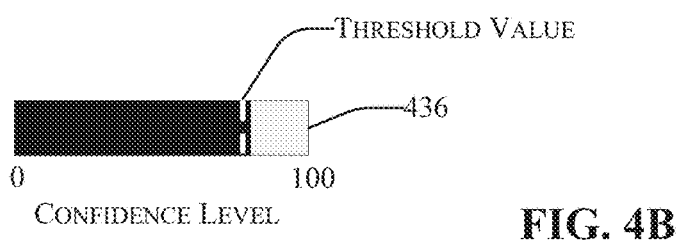

FIG. 4B depicts the resultant semantic segmentation performed using the image labeling algorithm, where blocks of pixels may be assigned to an outline that defines a characteristic of all pixels contained within the bound outline of each similar grouping. FIG. 4B further depicts a confidence level graph 436 to illustrate a relative confidence level of the semantic segmentation depicted in Frame 445. A threshold value is depicted that, when met or exceeded, may indicate the relative reliability of the labeled groupings in the frame 445. Accordingly, when it is determined that the semantic segmentation is sufficiently reliable, by comparing the percentage of the matching pixels from both semantics, the image frame(s) may be used by the system 107 to perform measurements, plot a path, and complete delivery tasks.

Figure 5:
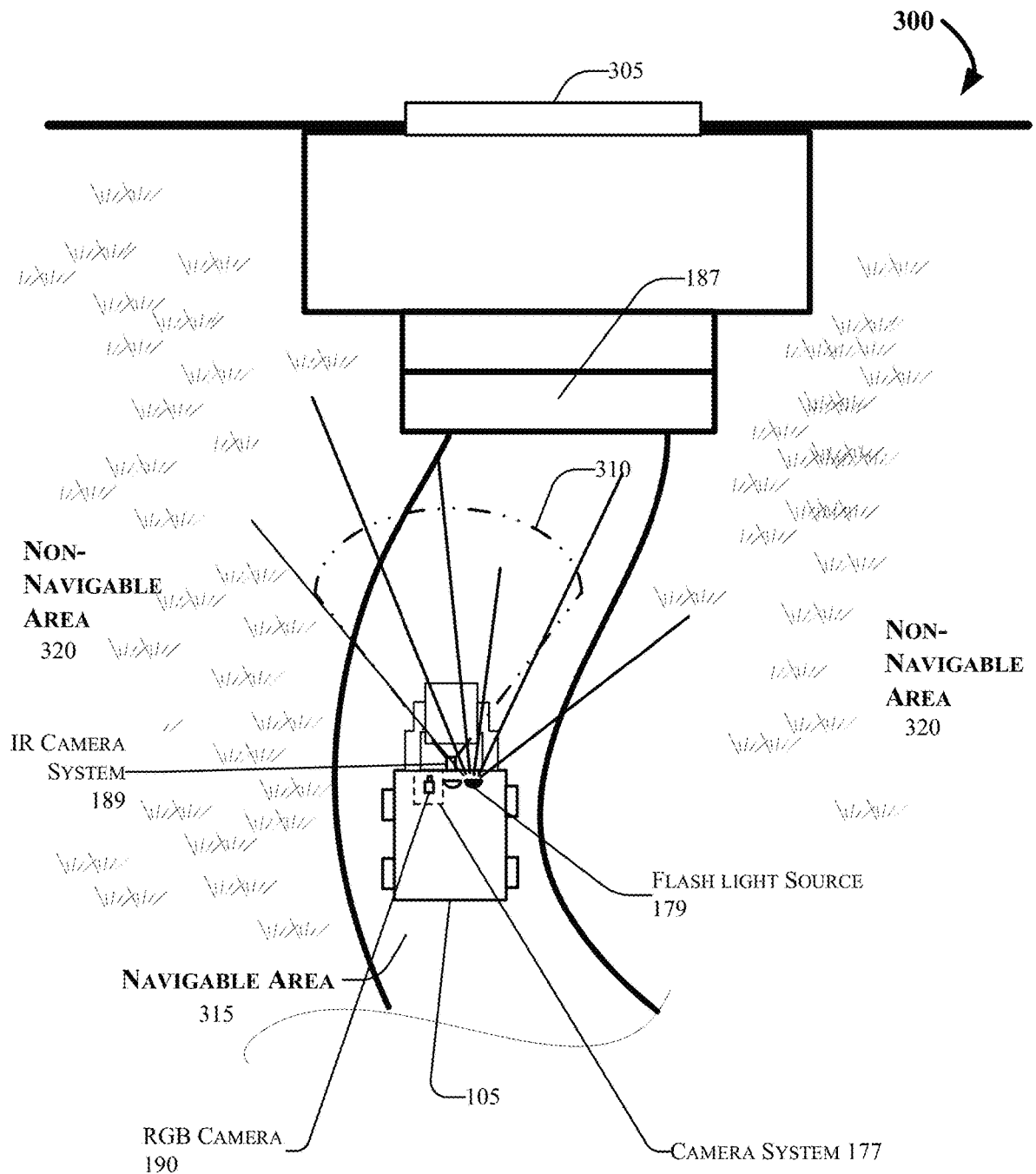
FIG. 5 illustrates the nighttime delivery system utilizing a flash light source in accordance with the present disclosure.

FIG. 5 illustrates the nighttime delivery system 107 utilizing a flash light source 179, in accordance with the present disclosure. In some aspects, the vehicle 105 may perform the package delivery using only an IR image segmentation. In other scenarios, the IR image alone may not provide sufficient information to affirmatively conclude that a generated trajectory would be reliable based on the IR image segmentation. For example, it is often challenging to extract segmentation masks of a target/object from a noisy collection of images or video frames, which involves object discovery coupled with segmentation. A noisy collection implies that the object/target is present sporadically in a set of images or the object/target disappears intermittently throughout the video of interest. Accordingly, the system 107 may perform a second image segmentation using the RGB camera of the camera system 177 onboard the vehicle 105 by taking a single flash image. By taking only a single flash image instead of actuating a continuous light to illuminate the path, the vehicle 105 may conserve power and avoid disturbing residents and others at night while the vehicle 105 is performing its delivery tasks. As explained above, the system 107 may map semantics from the RGB flash image to the IR image, which may increase the relative reliability of the image segmentation.

Figure 6:
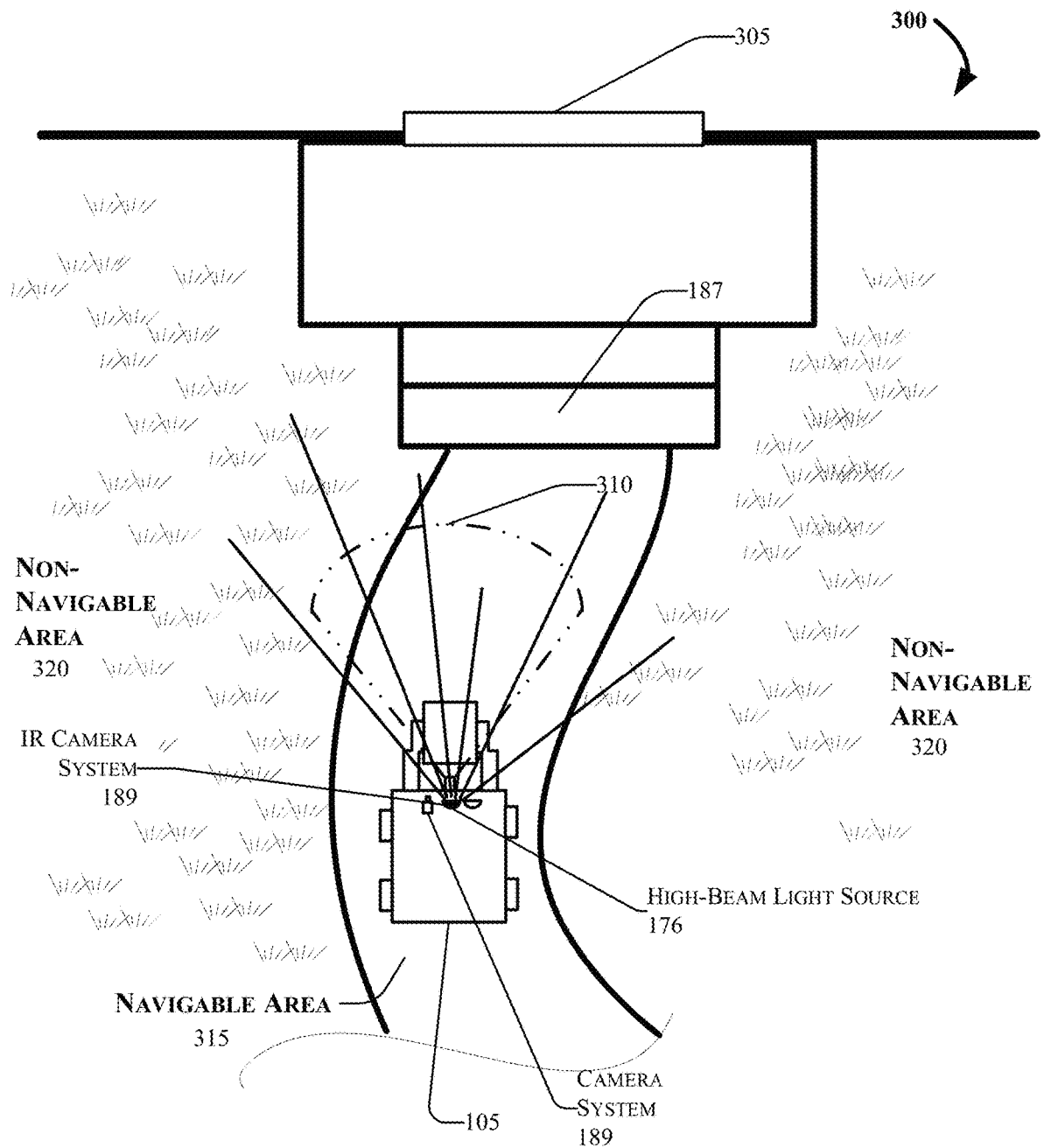
FIG. 6 illustrates the nighttime delivery system utilizing a high beam light source in accordance with the present disclosure.

In some instances, the combination of IR segmentation and the RGB segmentation may not provide adequate information to determine object identification, or to generate a reliable vehicle trajectory to the destination 187. Accordingly, the nighttime delivery system 107 may switch from autonomous mode to one of several remote control modes, to allow the human operator 169 (see FIG. 1) to take over control of the remote vehicle. FIG. 6 illustrates the nighttime delivery system utilizing a high beam light source, in accordance with the present disclosure. In one aspect, the teleoperator terminal 171 may issue commands to the vehicle 105 that control steering, motive control, package manipulation, and other tasks, using a video feed from the camera system 177. Accordingly, the vehicle 105 may enable a high beam light source 176 to illuminate the scene.

Figure 7:
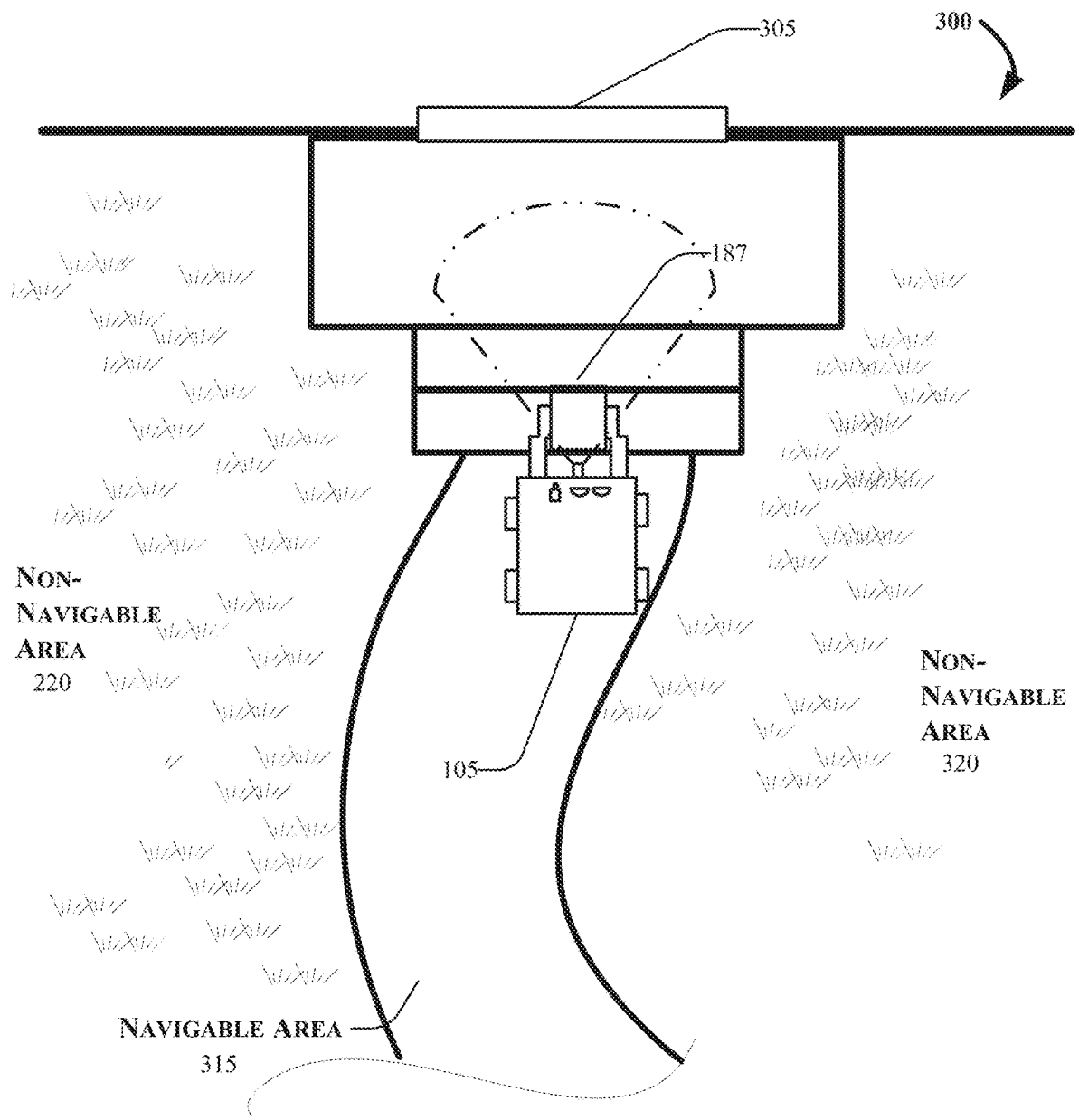
FIG. 7 depicts the nighttime delivery system delivering a package to a destination in accordance with the present disclosure.

FIG. 7 depicts the nighttime delivery system delivering a package to a destination in accordance with the present disclosure. In some aspects, the package may be left on a doorstep, in an alleyway, or some other predetermined location according to delivery instructions issued to the vehicle 105.

Figure 8:
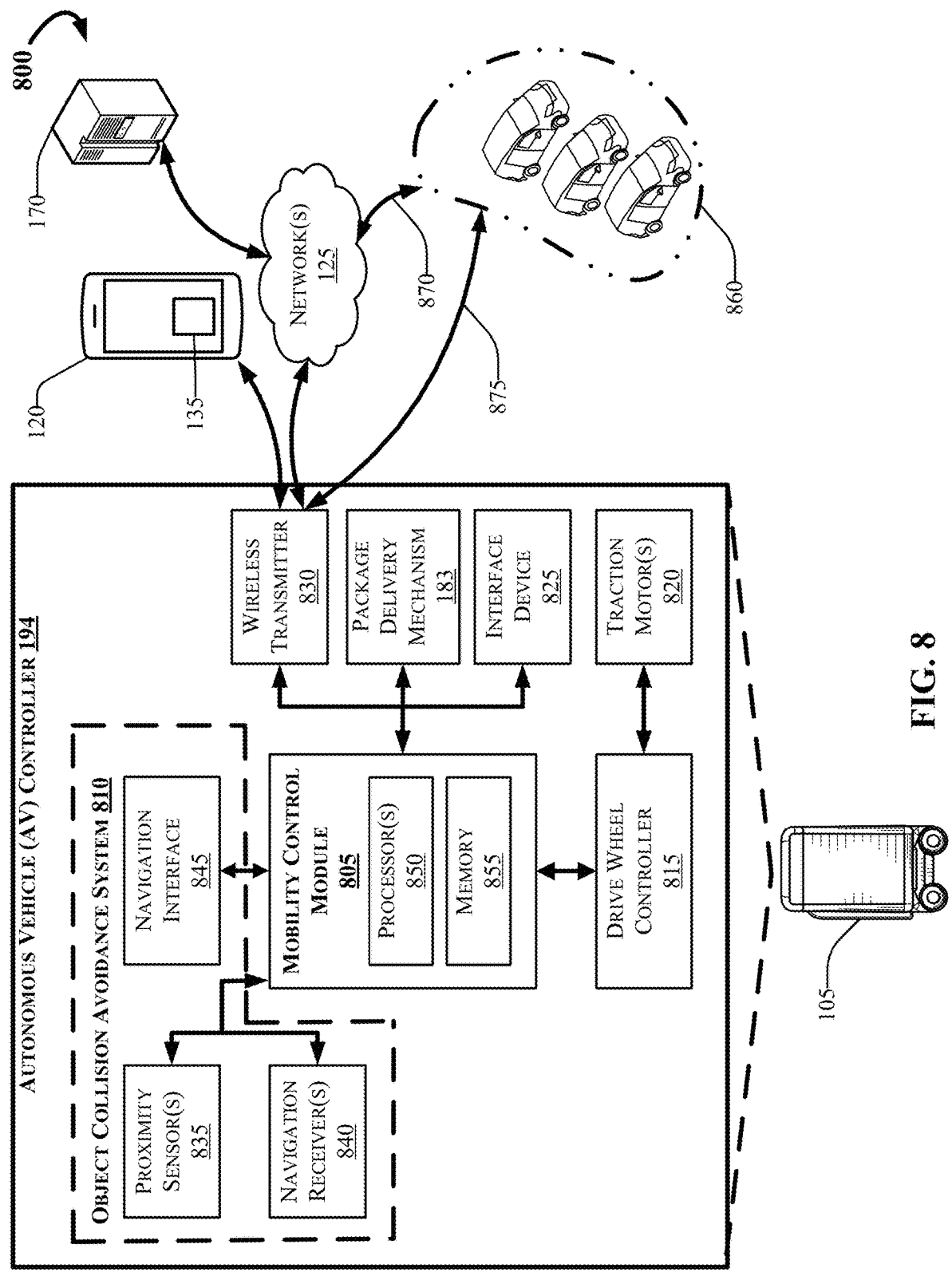
FIG. 8 depicts a block diagram of an example control system for an autonomous vehicle in accordance with the present disclosure.

FIG. 8 depicts a block diagram of an example autonomous vehicle controller (AVC) 194, in accordance with embodiments. The AVC 194 may include an object collision avoidance system 810 disposed in communication with a mobility control module 805. The object collision avoidance system 810 may perform object detection, navigation, and provide navigational interactive control features. The mobility control module 805 may be configured and/or programmed to receive data from the object collision avoidance system 810 to provide vehicle control.

The AVC 194 may be disposed in communication with and/or include the nighttime delivery system 107 (not shown in FIG. 8), in accordance with embodiments described herein. The mobility control module 805 may include one or more processor(s) 850, and a memory 855. The processor(s) 850 may be one or more commercially available general-purpose processor(s), such as a processor from the Intel® or ARM® architecture families. In some aspects, the mobility control module 805 may be implemented in a system on a chip (SoC) configuration, to include other system components such as RAM, flash storage and I/O buses. Alternatively, mobility control module 805 can be implemented using purpose-built integrated circuits, or any other suitable technology now known or later developed.

The memory 855 may include executable instructions implementing the basic functionality of the AVC 194 and a database of locations in a geographic area. For example, the mobility control module 805 may connect with a drive wheel controller 815. The drive wheel controller 815 may communicate signals to one or more traction motor(s) 820, which may embody a drive mechanism such as a brushless direct current (DC) motor, or another traction motor technology. The mobility control module 805 may cause the drive wheel controller 815 to transmit motive signals to the traction motor(s) 820 of the vehicle 105.

The AVC 194 may further include an interface device 825 having input and output surfaces (not shown in FIG. 8) for providing interactive access to users onboard the AV (e.g., the vehicle 105). For example, the interface device 825 may include a touch screen interface surface configured and/or programmed to provide operational information such as power consumption information, battery health, battery level, etc. In some embodiments, the interface device 825 may further provide control features for controlling other motive aspects of the vehicle 105, such as braking, acceleration, etc.

The vehicle 105 may be further configured and/or programmed to communicate information with other devices and vehicles using a wireless transmitter 830. The wireless transmitter 830 may communicate with one or more other vehicles in the delivery vehicle fleet 860, and/or a central routing computer (e.g., the server(s) 170 as described with respect to FIG. 1) using a wireless communication network such as, for example, the network(s) 125 as shown in FIG. 1. The network(s) 125 may be the Internet, a private network, a cellular telephone provider's data network, or other network infrastructure such as, for example, a vehicle-to-vehicle communication network. An example of a vehicle-to-vehicle communication protocol may be, for example, a dedicated short-range communication (DSRC) protocol for sharing information between delivery robots, and/or between the vehicle 105 and one or more other vehicles in a delivery vehicle fleet 860.

The vehicle 105 may communicate with one or more other vehicles in the delivery fleet 860 in various ways, including via an indirect communication channel 870 using the network(s) 125, and/or via any number of direct communication channels 875.

The object collision avoidance system 810 may include one or more proximity sensor(s) 835, one or more navigation receiver(s) 840, and a navigation interface 845 through which human operators 169 of the AVC 194 may issue motive and other control commands to the vehicle 105. The object collision avoidance system 810 may communicate control signals to a mobile device application (e.g., the application(s) 135 described with respect to FIG. 1).

The object collision avoidance system 810 may provide route management and communication between one or more other vehicles in the fleet 860, and to the human operator 169 of the vehicle 105 when disposed in remote control mode. The mobility control module 805 may receive navigational data from the navigation receiver(s) 840 and the proximity sensor(s) 835, determine a navigational path from a first location to a second location, and provide instructions to the drive wheel controller 815 for autonomous, semi-autonomous, and/or manual operation.

The navigation receiver(s) 840 can include one or more of a global positioning system (GPS) receiver, and/or other related satellite navigation systems such as the global navigation satellite system (GLNSS), Galileo, or other similar systems known in the art of autonomous vehicle operation. Additionally, the navigation receiver(s) 840 can be configured and/or programmed to receive locally-based navigation cues to aid in precise navigation through space-restricted areas, such as, for example, in a crowded street, and/or in a distributed beacon environment. When deployed in conjunction with a distributed beacon network (not shown in FIG. 8), locally based navigation cues can include communication with one or more purpose-built location beacons (not shown in FIG. 8) placed throughout a geographic area. The navigation cues may enable an increased level of navigation precision and provide specific indicators for locations of various points of interest. In other aspects, the navigation receiver(s) 840 may include one or more navigation transceivers (not shown in FIG. 8) for communication with mobile network infrastructure for cell tower triangulation and use of known-location Wi-Fi hotspots. Any location technology now known or later developed that can provide a high precision location (e.g. preferably within a linear foot) can be useful as part of navigation receiver(s) 840.

The proximity sensor(s) 835 may work in connection with the navigation receiver(s) 840 to provide situational awareness to the mobility control module 805 for autonomous navigation. For example, the proximity sensors may include one or more Radio Detection and Ranging (RADAR or "radar") sensors configured for detection and localization of objects using radio waves, a Light Detecting and Ranging (LiDAR or "lidar") sensor, a vision sensor system having trajectory, obstacle detection, object classification, augmented reality, and/or other capabilities, and/or the like.

The proximity sensor(s) 835 may alert the mobility control module 805 to the presence of sensed obstacles, and provide trajectory information to the mobility control module 805, where the trajectory information is indicative of moving objects or people that may interact with the vehicle 105. The trajectory information may include one or more of a relative distance, a trajectory, a speed, a size approximation, a weight approximation, and/or other information that may indicate physical characteristics of a physical object or person.

The mobility control module 805 may be configured and/or programmed to aggregate information from navigation receiver(s) 840, such as current position and speed, along with sensed obstacles from the proximity sensor(s) 835, and interpret the aggregated information to compute a safe path towards a destination such that the vehicle 105 avoids collisions. Sensed obstacles can include other vehicles, pedestrians, animals, structures, curbs, and other random objects. In some implementations the proximity sensor(s) 835 may be configured and/or programmed to determine the lateral dimensions of the path upon which the vehicle 105 is traveling, e.g. determining relative distance from the side of a sidewalk or curb, to help aid the mobility control module 805 in maintaining precise navigation on a particular path.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application-specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for controlling a robot, comprising:
   determining localization information indicative of a present location of the robot;
   performing a first semantic segmentation using heat signature data of an operating environment proximate to the robot;
   performing a second semantic segmentation using a single flash image of the operating environment proximate to the robot;
   navigating, based on the first semantic segmentation and the second semantic segmentation, the robot to a destination;
   determining that a semantic segmentation confidence value of the first semantic segmentation and the second semantic segmentation is not equal to or greater than a threshold value;
   notifying a teleoperator control terminal;
   receiving a robot control signal responsive to notifying the teleoperator control terminal;
   navigating the robot to the destination via the robot control signal;

engaging a light source onboard the robot responsive to receiving the robot control signal;
obtaining an operating environment video feed;
transmitting the operating environment video feed to the teleoperator control terminal;
performing a third semantic segmentation on the operating environment video feed while engaging the light source;
determining that the semantic segmentation confidence value of the third semantic segmentation is equal to or greater than the threshold value; and
sending a resume notification to the teleoperator control terminal responsive to determining that the semantic segmentation confidence value of the third semantic segmentation is equal to or greater than the threshold value.

2. The method according to claim 1, further comprising:
mapping the second semantic segmentation to the first semantic segmentation.

3. The method according to claim 1, further comprising:
navigating to the destination using the first semantic segmentation and the second semantic segmentation responsive to determining that a semantic segmentation confidence value of the first semantic segmentation and the second semantic segmentation is equal to or greater than a threshold value.

4. The method according to claim 1, further comprising:
detecting a doorway at the destination, wherein detecting the doorway comprises:
taking a first door locating flash image at a first camera orientation;
taking a second door locating flash image at a second camera orientation;
performing semantic segmentation on the first door locating flash image and the second door locating flash image;
determining that a semantic segmentation confidence value associated with the first door locating flash image and the second door locating flash image is equal to or greater than a threshold value;
navigating to the doorway at the destination; and
leaving a package at the doorway.

5. A nighttime robot delivery system, comprising:
a processor; and
a memory for storing executable instructions, the processor programmed to execute the instructions to:
obtain localization information indicative of a present location of the robot;
perform a first semantic segmentation using heat signature data indicative of a heat signature of an operating environment proximate to the robot;
perform a second semantic segmentation using a single flash image of the operating environment;
navigate, based on the first semantic segmentation and the second semantic segmentation, the robot to a destination;
determine that a semantic segmentation confidence value is not equal to or greater than a threshold value;
notify a teleoperator control terminal;
receive a robot control signal responsive to notifying the teleoperator control terminal;
navigate the robot to the destination via the robot control signal;
engage a light source onboard the robot responsive to receiving the robot control signal;
obtain an operating environment video feed;
transmit the operating environment video feed to the teleoperator control terminal;
perform a third semantic segmentation on the operating environment video feed while engaging the light source;
determine that the semantic segmentation confidence value of the third semantic segmentation is equal to or greater than the threshold value; and
send a resume notification to the teleoperator control terminal responsive to determining that the semantic segmentation confidence value of the third semantic segmentation is equal to or greater than the threshold value.

6. The system according to claim 5, wherein the processor is further programmed to:
map the second semantic segmentation to the first semantic segmentation.

7. The system according to claim 5, wherein the processor is further programmed to:
navigate the robot to the destination using the first semantic segmentation and the second semantic segmentation responsive to determining that a semantic segmentation confidence value is equal to or greater than a threshold value.

8. The system according to claim 5, wherein the processor is further programmed to:
detect a doorway at the destination, wherein detecting the doorway comprises:
take a first door locating flash image at a first camera orientation;
take a second door locating flash image at a second camera orientation; and
perform semantic segmentation on the first door locating flash image and the second door locating flash image.

9. A robot for nighttime delivery, comprising:
a vehicle chassis comprising:
a vehicle perception system (VPS); and
a telematics control unit (TCU);
a package delivery mechanism;
a light source disposed in communication with the VPS; and
a vehicle computing system comprising:
a processor; and
a memory for storing executable instructions, the processor programmed to execute the instructions to:
obtain, via the TCU, localization information indicative of a present location of the robot;
obtain, via the VPS, heat signature data indicative of heat signature of an operating environment proximate to the nighttime delivery robot;
obtain, via the VPS, a single flash image of the operating environment proximate to the robot;
perform a first semantic segmentation using the heat signature data and a second semantic segmentation using the single flash image of the operating environment proximate to the robot;
navigate the robot to a destination using the first semantic segmentation and the second semantic segmentation;
determine that a semantic segmentation confidence value is not equal to or greater than a threshold value;
notify a teleoperator control terminal operable by a human operator via the TCU;
receive, via the TCU, a robot control signal responsive to notifying the teleoperator control terminal;

navigate the robot to the destination via the robot control signal; and deliver a package at the destination via the package delivery mechanism;

engage the light source responsive to receiving the robot control signal;

obtain, via the VPS, an operating environment video feed;

transmit the operating environment video feed to the teleoperator control terminal via the TCU;

perform a third semantic segmentation on the operating environment video feed while engaging the light source;

determine that the semantic segmentation confidence value of the third semantic segmentation is equal to or greater than the threshold value; and send, via the TCU, a resume notification to the teleoperator control terminal responsive to determining that the semantic segmentation confidence value of the third semantic segmentation is equal to or greater than the threshold value.

10. The nighttime delivery robot of claim 9, wherein the processor is further programmed to:

map the second semantic segmentation to the first semantic segmentation.

11. The nighttime delivery robot of claim 9, wherein the processor is further programmed to:

navigate to the destination using the first semantic segmentation and the second semantic segmentation responsive to determining that a semantic segmentation confidence value is equal to or greater than a threshold value.

* * * * *